Dec. 27, 1960 C. D. HOBSON ET AL 2,966,002
LIVE BAIT TANK
Filed July 7, 1958
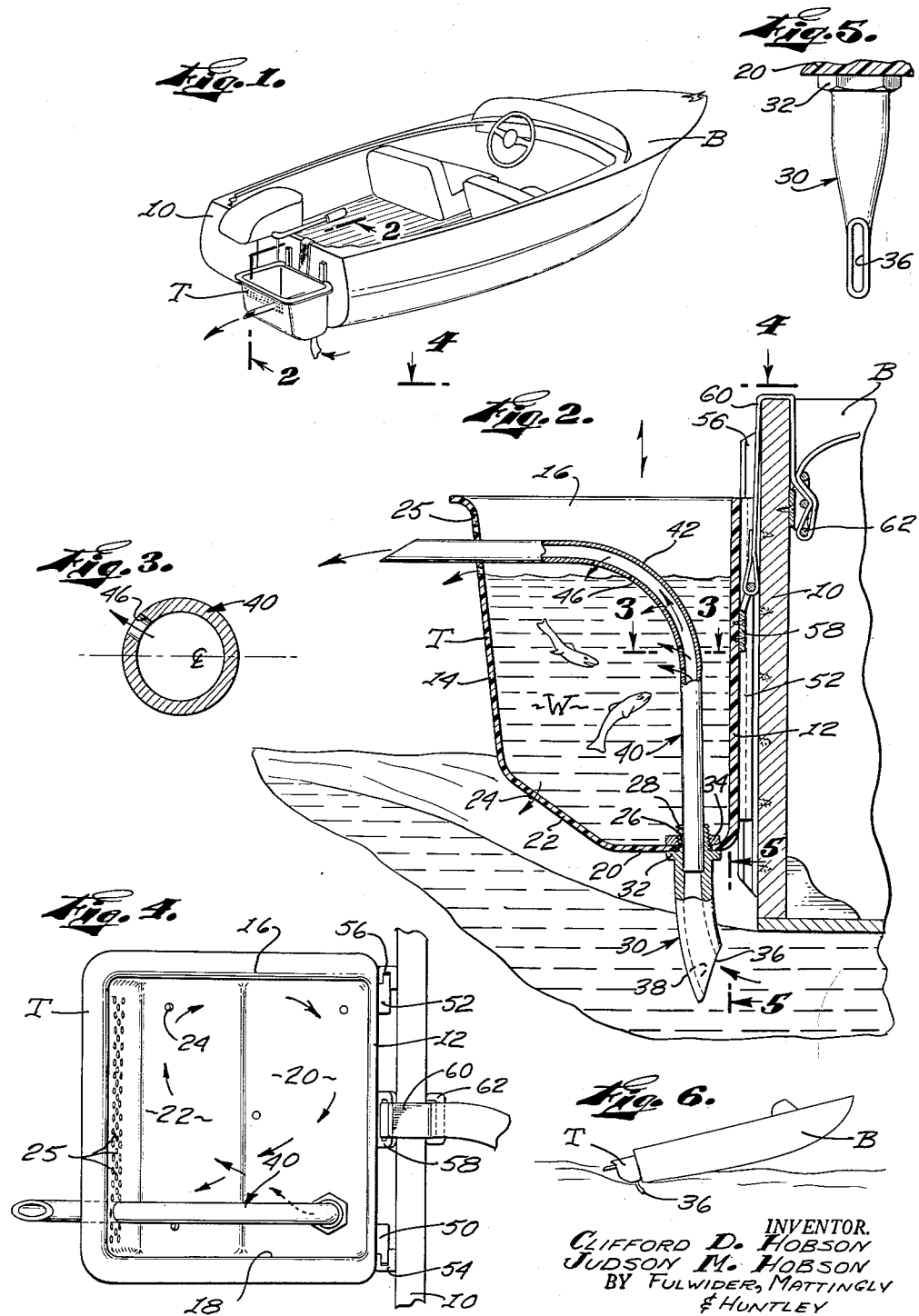
INVENTOR.
CLIFFORD D. HOBSON
JUDSON M. HOBSON
BY FULWIDER, MATTINGLY
& HUNTLEY
ATTORNEYS

2,966,002
Patented Dec. 27, 1960

2,966,002
LIVE BAIT TANK

Clifford D. Hobson, 14182 Brookhurst Ave., Garden Grove, Calif., and Judson M. Hobson, 13776 Pine St., Westminster, Calif.

Filed July 7, 1958, Ser. No. 746,862

6 Claims. (Cl. 43—55)

The present invention relates generally to fishing and more particularly to a new and novel live bait tank.

There have been heretofore proposed many types of tanks that are permanently or temporarily attached to a fishing boat for the purpose of carrying live bait. In the majority of these heretofore proposed bait tanks it is necessary to provide a motor-driven pump for circulating fresh water through the tank. Such circulation is necessary in order to keep the bait alive and vigorous.

It is a major object of the present invention to provide a bait tank which does not require a pump in order to effect circulation of fresh water therethrough.

It is another object to provide a bait tank of the aforedescribed nature wherein the circulation of water is self-regulating, with a substantially constant volume of water being circulated through the tank at all times.

Another object is to provide a bait tank of the aforedescribed nature having a scoop which extends into the water so as to receive fresh water during forward movement of the boat, and a curved tube attached to this scoop and extending upwardly and rearwardly through the tank. The inner periphery of this tube is formed with a plurality of apertures, while the rear end of the tube is open. With this arrangement, during forward movement of the boat, fresh water will be urged upwardly and rearwardly through the curved tube with a substantially constant volume entering the interior of the tank through the aforementioned apertures regardless of the speed of the boat.

It is a further object of the present invention to provide a bait tank of the aforedescribed nature having ports formed in its walls and secured to the boat in such a manner that it may be lowered into the water when the boat is no longer under way, fresh water being circulated through the tank at this time through the aforementioned ports.

An additional object of the invention is to provide a live bait tank of the aforedescribed nature which is removably attachable to the transom of a boat, with the bait tank exerting a minimum amount of water drag when the boat is undergoing forward motion.

A further object is to provide a bait tank of the aforedescribed nature which is light in weight, compact of size and economical of manufacture.

These and other objects and advantages of the present invention will become apparent from the following detailed description when taken in conjunction with the appended drawings wherein:

Figure 1 is a perspective view showing a preferred form of live bait tank embodying the present invention secured to the transom of a fishing boat;

Figure 2 is a vertical sectional view of said bait tank taken on line 2—2 of Figure 1;

Figure 3 is an enlarged horizontal sectional view taken along line 3—3 of Figure 2;

Figure 4 is a top plan view of said bait tank;

Figure 5 is an enlarged front view of a scoop member employed with said tank taken along line 5—5 of Figure 2; and Figure 6 is a reduced side elevational view showing the relation of said bait tank to a boat when the latter is under way.

Referring to the drawings and particularly Figure 1 thereof, a preferred form of bait tank T is shown secured to the transom 10 of a power boat B of conventional construction. It should be noted that the bait tank T may be employed with various types of boats other than the one shown in the drawings. Additionally, while the bait tank T is shown supported upon the transom 10 of the boat B, it may be arranged in various other locations relative to a boat.

The bait tank T is of open-topped construction having a front wall 12, a rear wall 14, side walls 16 and 18, and a bottom wall that includes a horizontal front portion 20 and a rear portion 22 that is inclined upwardly and rearwardly, as shown particularly in Figure 2. In practice, it has been found desirable to form the aforementioned walls of plastic resin-reinforced glass fiber matting. The bottom and rear walls are formed with a plurality of ports 24 and 25, respectively, for a purpose to be fully set forth hereinafter.

Referring again to Figure 2 the front portion of the bottom wall 20 is formed with a vertically extending bore 26. This bore 26 receives an externally threaded neck 28 formed at the upper end of a downwardly and forwardly extending scoop, generally designated 30. A flange 32 is formed on the upper portion of the scoop 30 below the neck 28 abutting the underside of the bottom tank wall portion 20. The externally threaded neck 28 is rigidly affixed to the tank T by means of a lock nut 34, the underside of which abuts the upper surface of the bottom wall portion 20. The scoop 30 is formed with an open forwardly-facing inlet 36 at its lower portion. This inlet 36 is in communication with a passage 38 extending through the scoop. The upper end of the passage 38 telescopically receives the lower end of a circulation tube, generally designated 40. Preferably, the lower end of this tube 40 is suitably secured in place within the scoop.

The circulation tube 40 extends upwardly from the scoop S to the intermediate portion of the interior of the tank T. At this point it is formed with an upwardly and rearwardly curved intermediate portion 42. The rear portion of the circulation tube 40 extends horizontally rearwardly through the rear wall 14 of the tank T. The rear end of this circulation tube 40 is open. The inner periphery of the intermediate portion 42 is formed with a plurality of discharge apertures 46, for a purpose to be set forth hereinafter.

Referring now particularly to Figures 2 and 4, the exterior surface of the front wall 12 is formed with a pair of elongated, vertically extending slide elements 50 and 52. These slide elements 50 and 52 cooperate with a pair of track elements 54 and 56, respectively, affixed to the rear of the boat transom 10 to permit vertical movement of the tank T relative to the transom 10. The midportion of the front wall 12 is formed with a bracket 58. This bracket 58 receives the lower end of a strap 60 that extends upwardly around the upper end of the transom 10 and then downwardly to a suitable clamp assembly 62 of conventional construction. This arrangement permits the tank T to be locked at any desired elevation relative to the boat transom.

In the operation of the aforedescribed bait tank T, it is first affixed to the boat transom 10 by means of the aforedescribed slides 50, 52 and tracks 54, 56, with the elevation of the tank relative to the transom being adjusted by means of the strap 60 and the clamp assembly 62. Assuming the boat is to undergo forward movement to the fishing area, the tank T will be elevated to a position indicated in Figures 1, 2 and 6. In this position, the inlet 36 of the scoop 30 will be disposed somewhat below the underside of the boat B and pointing forwardly relative to the boat. The interior of the tank is then filled with water W and the live bait is placed therein.

When the boat undergoes forward motion, water will enter the inlet of the scoop 30 and be forced upwardly through the circulation tube 40 in a manner indicated by the directional arrows in Figure 3. This water passes upwardly through the circulation tube 40 and then rearwardly through its intermediate portion to finally be discharged through the open rear end of the tube. A certain portion of the water flowing through the circulation tube 40 will pass through the discharge apertures 46 into the interior of the tank T, as is also indicated by the directional arrows in Figure 2. It will be understood that the greater the forward speed of the boat B, the higher the velocity at which the water flows through the circulation tube 40. At lower boat speeds, water from the circulation tube 40 will flow through all of the discharge apertures 46. As the velocity of the water flowing through the circulation tube 40 increases, however, because of its centrifugal force as it passes through the curved portion 42 of the tube, the water will no longer tend to flow through the upper discharge apertures 46. Instead, this water will only tend to flow through the lower discharge apertures. The velocity of flow through these lower discharge apertures, however, will be greater than where the incoming water is flowing through all of the apertures. In this manner, the volume of fresh water entering the tank T will be maintained substantially constant regardless of the velocity at which the boat B is moving forwardly. Should there be a momentary excess amount of water entering the tank, or should the boat's bow pitch upwardly, water will be discharged through the ports 25 formed in the upper portion of the rear tank wall 14.

Referring now particularly to Figures 3 and 4, it will be noted that the discharge apertures 46 are formed to one side of the rear center of the circulation tube 40. In this manner, the water from within the circulation tube 40 discharging through the discharge ports will be directed rearwardly and to the side of the tank T remote from the circulation tube 40. In this manner, the water entering the tank T through the circulation tube 40 will follow a circular path relative to the interior of the tank and thereby reach each portion of the latter.

When the boat B has reached the fishing area, the clamp assembly 62 and the strap 60 will be manipulated so as to permit the tank to be lowered relative to the boat transom 10. The tank T should be so positioned that its upper end is above the surface of the water supporting the boat B, but with the ports 24 and 25 below the level of the water supporting the boat. Fresh water will thereby be permitted to recirculate through the tank and maintain the live bait alive and vigorous. When the boat is to be again moved, the tank T will be raised to its original position.

Referring now to Figure 6, it should be particularly observed that with the tank T in its position of Figures 1, 2 and 6, it will exert a minimum amount of water drag. This results from the fact that the bottom wall includes the upwardly and rearwardly inclined portion 22. As shown clearly in Figure 6, the wake flowing from the lower portion of the boat transom 10 conforms generally to the curvature of the bottom of the tank T. This would not be the case if the bottom of the tank extended horizontally from its front to its rear end. Instead, if this latter arrangement were employed, the rear lower portion of the tank would extend into and thereby exert drag upon the water.

While there has been shown and described hereinabove what is presently considered to be the preferred embodiment of the present invention, it will be apparent that various modifications and changes may be made thereto without departing from the spirit of the invention or the scope of the following claims.

We claim:
1. A live bait tank for use with a boat, comprising: a tank on said boat holding live bait and water, said tank being formed with ports; a scoop extending from the lower portion of said tank; and tube means extending from said scoop through the interior of said tank and then outwardly of said tank, a portion of said tube means within said tank being curved, with the inner peripheral section of said curved portion being formed with a plurality of discharge apertures, with forward movement of said boat effecting upward circulation of fresh water through said tube means, the greater the forward speed of said boat the higher the velocity at which said fresh water circulates through said tube, said fresh water flowing through substantially all of said discharge apertures at lower boat speeds with said fresh water flowing solely through the lower of said discharge apertures as its velocity increases because of the centrifugal force of said fresh water, whereby a substantially constant volume of fresh water is introduced into said tank regardless of the velocity at which said boat is moving forwardly.

2. A live bait tank for use with a boat, comprising: a tank on said boat holding live bait and water, said tank being formed with ports; a scoop extending from the lower portion of said tank; and a circulation tube having its lower end connected to said scoop, its intermediate portion within said tank being curved upwardly and rearwardly, and its rear portion extending rearwardly to the exterior of said tank, with the inner peripheral section of said curved tube portion being formed with a plurality of discharge apertures, with forward movement of said boat effecting upward circulation of fresh water through said tube means, the greater the forward speed of said boat the higher the velocity at which said fresh water circulates through said tube, said fresh water flowing through substantially all of said discharge apertures at lower boat speeds with said fresh water flowing solely through the lower of said discharge apertures as its velocity increases because of the centrifugal force of said fresh water whereby a substantially constant volume of fresh water is introduced into said tank regardless of the velocity at which said boat is moving forwardly.

3. A live bait tank as set forth in claim 2 wherein said discharge apertures are formed to one side of the rear center of said curved tube portion.

4. A live bait tank for use with a boat, comprising: a tank holding live bait and water, said tank being formed with ports; a scoop extending from the lower portion of said tank; tube means extending from said scoop through the interior of said tank and then outwardly of said tank, a portion of said tube means within said tank being curved, with the inner peripheral section of said curved portion being formed with a plurality of discharge apertures; and mounting means interposed between said tank and said boat, said mounting means including means for adjusting the elevation of said tank relative to said boat, with forward movement of said boat effecting upward circulation of fresh water through said tube means, the greater the forward speed of said boat the higher the velocity at which said fresh water circulates through said tube, said fresh water flowing through substantially all of said discharge apertures at lower boat speeds with said fresh water flowing solely through the lower of said discharge apertures as its velocity increases because of the centrifugal force of said fresh water, whereby a substantially constant volume of fresh water is introduced into said tank regardless of the velocity at which said boat is moving forwardly.

5. A live bait tank, comprising: a tank holding live bait and water, said tank being formed with ports; a scoop extending from the lower portion of said tank; a circulation tube having its lower end connected to said scoop, its intermediate portion curved upwardly and rearwardly, said intermediate portion being positioned within said tank and its rear portion extending rearwardly to the exterior of said tank, with the inner peripheral section of said curved tube portion being formed with a plurality of discharge apertures; and mounting means interposed between said tank and said boat, said mounting means including means for adjusting the elevation of said tank relative to said boat, with forward movement of said boat effecting upward circulation of fresh water through said tube means, the greater the forward speed of said boat the higher the velocity at which said fresh water circulates through said tube, said fresh water flowing through substantially all of said discharge apertures at lower boat speeds with said fresh water flowing solely through the lower of said discharge apertures as its velocity increases because of the centrifugal force of said fresh water, whereby a substantially constant volume of fresh water is introduced into said tank regardless of the velocity at which said boat is moving forwardly.

6. A live bait tank as set forth in claim 5 wherein said discharge apertures are formed to one side of the rear center of said curved tube portion.

References Cited in the file of this patent
UNITED STATES PATENTS

| | | |
|---|---|---|
| 2,485,684 | Aldredge | Oct. 25, 1949 |
| 2,672,114 | McCartney | Mar. 16, 1954 |
| 2,855,720 | Allen | Oct. 14, 1958 |

FOREIGN PATENTS

| | | |
|---|---|---|
| 68,398 | Sweden | Nov. 5, 1929 |